US009083803B2

(12) United States Patent
Chou et al.

(10) Patent No.: US 9,083,803 B2
(45) Date of Patent: *Jul. 14, 2015

(54) SYSTEMS AND METHODS FOR ALLOCATION OF TELEPHONY RESOURCES ON-DEMAND

(71) Applicant: Amazon Technologies, Inc., Seattle, WA (US)

(72) Inventors: Eric Chunyi Chou, Issaquah, WA (US); Terrence M. Skemer, Bellevue, WA (US); Jagwinder Singh Brar, Bellevue, WA (US); Zachary L. Yeager, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/536,453

(22) Filed: Nov. 7, 2014

(65) Prior Publication Data

US 2015/0063558 A1 Mar. 5, 2015

Related U.S. Application Data

(63) Continuation of application No. 14/059,317, filed on Oct. 21, 2013, now Pat. No. 8,908,855, which is a continuation of application No. 12/624,375, filed on Nov. 23, 2009, now Pat. No. 8,565,407.

(51) Int. Cl.
*H04M 3/523* (2006.01)
*H04M 7/00* (2006.01)
*H04M 3/51* (2006.01)

(52) U.S. Cl.
CPC ............ *H04M 3/5183* (2013.01); *H04M 3/523* (2013.01); *H04M 3/5234* (2013.01)

(58) Field of Classification Search
USPC .................. 379/219, 221.01, 221.06, 265.01, 379/265.02, 266.01–266.05
See application file for complete search history.

(56) References Cited

U.S. PATENT DOCUMENTS 8,565,407 B1 * 10/2013 Chou et al. ............... 379/265.02
8,908,855 B1 * 12/2014 Chou et al. ............... 379/265.02

* cited by examiner

*Primary Examiner* — Harry S Hong
(74) *Attorney, Agent, or Firm* — Knobbe, Martens, Olson & Bear, LLP

(57) ABSTRACT

Organizations may employ private computer networks to enable customers to place a telephone call to customer service agents (CSAs). To maintain high customer service, it may desirable to expand the private computer network's ability to respond to customer calls on-demand. One or more requests for additional telephony resources may be submitted to a telephony resource allocation service in communication with a configurable network service. The telephony resource allocation service may determine telephony resources available for allocation to the private computer network and facilitate communication between the configurable network service and the private computer network. In this manner, additional computer private network extensions executing instances of call distribution services may also be generated and configured. Thus, the capacity of the private computer network to respond to customer calls may be expanded, while the additional private network extensions may manage distribution of calls to the CSAs transmitted over the allocated telephony resources.

20 Claims, 5 Drawing Sheets

SYSTEMS AND METHODS FOR ALLOCATION OF TELEPHONY RESOURCES ON-DEMAND

CROSS-REFERENCE TO RELATED APPLICATIONS

This application is a continuation of U.S. patent application Ser. No. 14/059,317, entitled SYSTEMS AND METHODS FOR ALLOCATION OF TELEPHONY RESOURCES ON-DEMAND, and filed Oct. 21, 2013, which is a continuation of U.S. patent application Ser. No. 12/624,375, entitled SYSTEMS AND METHODS FOR ALLOCATION OF TELEPHONY RESOURCES ON-DEMAND, and filed Nov. 23, 2009, now U.S. Pat. No. 8,565,407, the entireties of which are incorporated herein by reference.

BACKGROUND

Organizations that conduct transactions with customers (e.g., businesses, non-profit organizations, government agencies, etc.) often seek to distinguish themselves by providing excellent customer service. For example, in order to address questions and concerns of potential and current customers, either pre- or post-transaction, organizations may provide telephone numbers that facilitate contact between their customers and customer service agents. To facilitate telephone contact with customers, call centers have been developed as a centralized, scalable mechanism to handle distribution of the received calls to available customer service agents.

The volume of calls received by an organization's call centers may vary significantly depending upon variety of factors. These factors may include, but are not limited to, time (e.g., time of day, month, or year), promotions to increase customer demand, and the like. In order to provide a satisfactory customer experience, it is desirable that sufficient resources are devoted to call centers to respond to projected customer call volume in a timely manner. However, to constrain costs, organizations may also wish to restrict the resources devoted to call centers to meet only the actual volume of calls received.

Unfortunately, it can be difficult to scale the resources devoted to call centers to respond to customer calls in a timely fashion. In one example, changing an amount of telephone capacity provided to an organization by a telephone provider may require a waiting period to implement. In another example, network resources used for balancing call loads amongst an organization's call centers and/or customer service agents may require investments in computing resources, as well as time and personnel to implement or dismantle. While telephone capacity and/or network call balancing resources are changed to satisfy differing levels of call demand, an organization's call centers may be over- or under-resourced, hurting customer service or incurring elevated operating costs unnecessarily.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
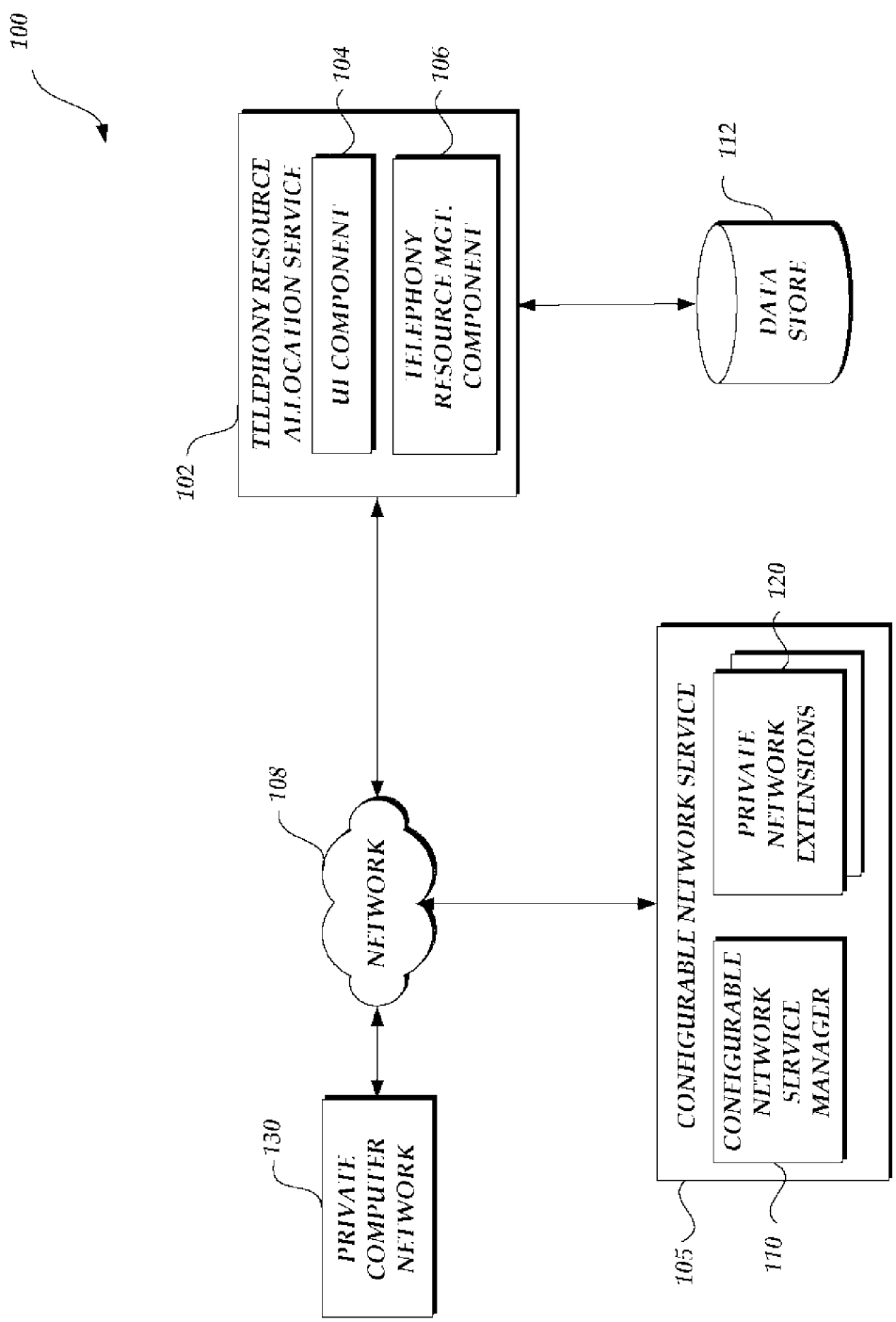
FIG. 1 is a schematic block diagram of an illustrative operating environment in which a telephony resource allocation service allocates, on demand, telephone resources and network extensions for such resources in response to requests received from a user of a private computer network.

Generally described, aspects of the present disclosure relate to systems and methods for allocating telephony resources on-demand (e.g., telephone lines, telephone numbers) to an existing computer network. For example, the computer network may include one or more call centers including customer service agents that receive incoming calls from end users. An operator of the computer network may find it advantageous to adjust the telephony resources available to the computer network in order to meet existing or projected call demand so as to provide superior customer service. In a non-limiting example, the computer network may be operated by a network-based retailer and the end user may include an individual who has made a purchase from the network-based retailer.

In an embodiment, the computer network may include a private computer network. Private networks may include networks that are partially or wholly inaccessible to unauthorized end users. Examples of private networks may include, but are not limited to, corporate networks, home networks, university networks, and the like. Private networks may include one or more networks. The private computer network may further include computing systems and/or other networked devices.

Further aspects of the disclosure relate to providing additional computer networks that execute services in support of the allocated telephony resources (referred to herein as private network extensions). The private network extensions may be configured to communicate with the existing computer networks, providing substantially seamless integration of the private computer network and private network extensions.

The network extensions, in further embodiments, may include one or more computing devices and/or other networked devices which execute instances of a call distribution service. Call distribution services may perform functions including, but not limited to, allocating, routing, and maintaining telephone connections between an end user which places a call and a customer service agent (CSA). For example, the customer service agent may include a customer service agent operating one or more computing devices (e.g., computers, telephones, etc.) in communication with the private computer network. Connections may be established between the end user's telephone, the CSA's telephone, and client devices operated by the CSA. The call distribution service may further connect end users and CSAs through public networks, which may include networks operated by telephony carriers and other data carriers.

In certain embodiments, the network extensions may be executed on one or more computing devices and/or other networked devices that are location specific. For example, the based upon the topology of a network, it may be advantageous to execute instances of a call distribution service on one or more selected computing devices that are located at a specific position in the network with respect to the private computer network supported by the executed call distribution service. In one non-limiting example, the private computer network and one or more computing device executing call distribution service instances may be close to each other, with respect to network topology. In this manner, closeness of the computing devices executing call distribution service instances and the private computer network may improve the call distribution performance. In further embodiments, the computing devices upon which the call distribution service instances are executed may be dynamically changed, based upon variations in network conditions, such as network traffic, in order to maintain or improve call distribution performance.

In this regard, a telephony resource allocation service is described that allocates telephony resources in response requests for telephony resources received from a user, such as a user utilizing a user computing device that is part of the private computer network. Accordingly, the request for telephony resources may include a request for telephony resources of the type needed for a call center (e.g., additional telephone lines for the call center, additional telephone numbers for the call center, and a duration over which the telephone lines and/or telephone numbers are desired).

As described in greater detail below, the telephony resource allocation service may review the request and indicate whether the request may be accommodated in full, in part, or not at all. For example, if the telephony resources requested by the private computer network are available for allocation, the telephony resource allocation service may indicate that the request may be satisfied in full. If only a portion of the telephony resources requested by the private computer network are available for allocation, the telephony resource allocation service may indicate that the request may be satisfied in part. If no telephony resources are available for allocation, the telephony resource allocation service may indicate that the request may not be satisfied. The telephony resource allocation service may further request configuration information from the user utilizing a user computing device that is part of the private computer network in order to facilitate integration of the user's private computer network with private network extensions generated on behalf of the user in support of its requested telephony resources.

With the user's approval to allocate the indicated telephony resources, the telephony resource allocation service may further submit information regarding the allocated telephony resources and the configuration information to a configurable network service (CNS). The CNS may create one or more private network extensions based upon the telephony resources allocated for the requesting private computer network. In an embodiment in which the requesting private computer network is a call center, the private network extensions may provide one or more automated call distribution services using the allocated telephony resources.

In an embodiment, the CNS may include hardware, software, and combinations thereof and may be operative to provide the private computer network with access to the private network extensions. For example, the private computer network may automatically interact with the CNS to create and configure one or more private network extensions for use by the private computer network. In other embodiments, the user employing a user computing device that is part of the private computer network may manually interact with the CNS (e.g., through one or more user interfaces) to create and configure the one or more private network extensions. The private network extensions may be provided by the CNS and include multiple computing nodes that are maintained or otherwise under control of the CNS.

Accordingly, once the private network extensions are configured for communication with the private computer network, the private network extensions, including automated call distribution operations, may be operated as if they were a part of the private computer network. Thus, calls intended for the call center implemented as a private computer network may be seamlessly distributed to, and processed by, one or more of private network extensions.

The CNS may also establish private connections between the private network extensions and the private computer network. For example, virtual private network (VPN) connections may be established between the private network extensions and the private computer network. Through the use of VPN connections, connections between the private network extensions and the private computer network may be afforded high security. In certain embodiments, VPN connections may comprise secure VPN connections. In alternative embodiments, VPN connections may comprise unsecure VPN connections. In additional embodiments, the VPN connections may comprise combinations of secure and unsecure VPN connections.

The CNS may also associate the telephony resources allocated to the private computer network to the private network extensions. In this manner, calls that are routed to a telephone number or telephone line allocated to the private computer network may be directed to the private network extensions executing the automated call distribution service. Owing to the connection between the private network extensions and private computer network, these calls may be routed to a private network extension that implements a call distribution instance, which subsequently distributes the call to the private computer network (e.g., a call center).

In this manner, telephony resources may added or removed from the private computer network on-demand in response to changing call volumes. In one aspect, this flexibility may reduce the need for long term forecasting of telephony demand and adjustment of the telephony resources and private network extensions (e.g., automated call distribution services) to meet long-term projected demand.

Instead, telephony resources may be requested for the private computer network in response to short term forecasts, which are likely to be more accurate than long term forecasts, or even in response to instantaneous demand. In response to such requests, the CNS may create computer networks that execute automated call distribution services and integrate of networks with existing private computer network. Thus, telephony resources may be allocated private computer network and additional automated call distribution services may be provided at the time of request.

Furthermore, should demand for telephony resources fall, the added telephony resources and automated call distribution services may be terminated. Thus, from the user's standpoint, telephony resources may be rapidly changed without negotiations with telephony providers (e.g., telecommunications operators) or incurring the expense of acquiring and maintaining computing resources to support the additional telephony resources.

With reference to FIG. 1, an embodiment of an operating environment 100 for allocating telephony resources and providing private network extensions to a private computer network 130 is illustrated. As discussed above, the private computer network 130 may include one or more existing private networks, such as a corporate or other private network (e.g., home, university, etc.) that is partially or wholly inaccessible to non-privileged end users. The private computer network 130 may further include one or more computing systems and/or other networked devices.

In the operating environment 100, a user (e.g., a user having access to the private computer network 130) may employ a computing device incorporated within the private computer network 130 to communicate with a telephony resource allocation service 102. The user may further submit a request for telephony resources to the telephony resource allocation service 102. Requests regarding telephony resources may be further directed to a configurable network service (CNS) 105 in communication with the telephony resource allocation service 102. The CNS 105 may create and configure one or more private network extensions to provide additional services to the private computer network as discussed in greater detail below.

It will be recognized that many of the components described below are optional and that embodiments of the system 100 may or may not combine components. Components need not be distinct or discrete. Components may be reorganized in the system 100. For example, the telephony resource allocation service 102 and CNS 105 may be represented in a single physical server or computing system containing all of the subsystems described below or, alternatively, may be split into multiple physical servers.

The telephony resource allocation service 102 and CNS 105 may each be embodied in a plurality of components, each executing an instance of the respective telephony resource allocation service 102 and CNS 105. A server or other computing system implementing the telephony resource allocation service 102 or CNS 105 may include a network interface, memory, processing unit and computer readable medium drive, all of which may communicate which each other may way of a communication bus. The network interface may provide connectivity over the network 108 and/or other networks or computer systems. The processing unit may communicate to and from memory containing program instructions that the processing unit executes in order to operate the telephony resource allocation service 102 or CNS 105. The memory generally includes RAM, ROM, and/or other persistent and auxiliary memory.

In an embodiment, the telephony resource allocation service 102 may include a user interface component 104 and a telephony resource management component 106. The user may employ one or more computing devices included in the private computer network 130 to communicate with the telephony resource allocation service 102 via one or more user interfaces provided by the user interface component 104. Such user interfaces may be generated by the user interface component 104 or retrieved from a memory device in communication with the telephony resource allocation service 102, such as data store 112 in communication with the telephony resource allocation service 102

For example, the user may submit one or more requests for telephony resources, including, but not limited to, telephone lines and telephone numbers for a selected duration of time. Such durations of time may include a fixed period of time, such as between date ranges. Other fixed periods of time may include selected hours for selected days of the week. Other time ranges may include open-ended time ranges. In one instance, an open-ended time range may include a time range which begins on a selected date and/or time until otherwise instructed. In another instance, an open-ended time range may include a time range which starts and/or ends according to selected criteria, such as call volume received by call centers of the private computer network 130.

The telephony resource allocation service 102 may further include a telephony resource management component 106. In response to receiving a request for telephony resources, the telephony resource management component 106 may determine whether sufficient telephony resources are available to the telephony resource allocation service 102 to satisfy the received request. For example, the telephony resource management component 106 may obtain records of available telephony resources from the data store 112 and compare these records with the telephony resource request. Based upon this comparison, the telephony resource management component 106 may determine if the telephony resource allocation service 102 may satisfy the user's telephony resource request.

For example, assume that a user submits a request for one hundred telephone lines and ten telephone numbers. The telephony resource management component 106 may retrieve records from the data store 112 in order to determine the amount of telephony resources available for allocation. If the retrieved records indicate that the telephony resource allocation service 102 has three hundred telephone lines and fifty telephone numbers available for allocation, an amount which is greater than the requested amount of telephony resources, the management component 106 may determine that the request for telephony resources may be satisfied in full. If the retrieved records indicate that the telephony resource allocation service 102 has only sixty telephone lines and five telephone numbers available for allocation, an amount which is less than the requested amount of telephony resources, the management component 106 may determine that the request for telephony resources may only be satisfied in part. If the retrieved records indicate that the telephony resource allocation service 102 has no available telephone lines or telephone numbers available for allocation, the telephony resource management component 106 may determine that the request for telephony resources may not be satisfied.

In further embodiments, the telephony resource management component 106 may also determine a quantity of private network extensions 120 and/or associated computing nodes for adequate support of the requested allocation of telephony resources. As discussed below, the private network extensions 120 may include one or more computing nodes.

In one embodiment, this determination may be made based upon the amount of telephony resources requested. For example, the telephony resource management component 106 may determine that a selected number of private network extensions 120 having a further selected number of computing nodes may be necessary to support the requested amount of telephony resources (referred to herein as supporting computing resources). Such a determination may be further based upon factors such as performance characteristics of the computing nodes (e.g., processor speed, memory available, storage available, etc.). The telephony resource management component 106 may employ lookup tables, formulas, and the like determine the supporting computing resources.

In certain embodiments, the supporting computing resources may also be considered when ascertaining whether a user request for telephony resources may be satisfied in full, in part, or not at all. The supporting computing resources may be compared with available quantities of computing resources. Records of available computing resources may also be maintained within the data store 112.

For example, if the both the available telephony resources and the available computing resources exceed the requested telephony resources and the supporting computing resources, then the telephony resource management component 106 may determine that the request for telephony resources may be satisfied in full. If either of the retrieved records for available telephony resources and available computing resources fails to exceed the requested telephony resources or the supporting computing resources, respectively, then the telephony resource management component 106 may determine that the request for telephony resources may be satisfied in part. If no telephony resources or computing resources are available, then the telephony resource management component 106 may determine that the request for telephony resources may not be satisfied.

An indication of the telephony resources available for allocation to the private computer network 130 may be provided to the private computer network 130 for approval to allocate the telephony resources. The telephony resource allocation service 102 may further request configuration information from the private computer network 130 in order to facilitate configuration of private network extensions 120 for use with the private computer network 130. The configuration information may include information which enables the CNS 105 to communicate with the private computer network 130 in order create private network extensions 120.

Upon acceptance of the offered telephony resource allocation by the private computer network 130, and receipt of the configuration information for the private computer network 130, the telephony resource allocation service 102 may submit the information regarding the supporting computing resources and the configuration information to the CNS 105. The CNS 105 may in turn employ at least a portion of this information for creation of the one or more private network extensions 120. As further discussed below, the private network extensions 120 may further execute one or more instances of an automated call distribution service (ACD) that automatically distributes calls.

In further embodiments, the telephony resources allocated to the private computer network 130 may be further provided according a selected quality of service (QoS) level. Continuing the example above, assume that the user accepts an offered telephony resource allocation for one hundred telephone lines. The user may further be presented with options for guaranteed service for ten active calls, twenty active calls, thirty active calls, and the like, each having different prices. For example, as the number guaranteed active lines increases as a proportion of the total telephone line allocation, the QoS price may be increased. QoS levels may be further changed dynamically, as necessary. For example, QoS levels may be changed based upon factors including, but not limited to, timing (e.g., time of day, day of week, day of year). Beneficially, tiered pricing arrangements for differing QoS may provide users with the flexibility to obtain telephony resource allocations and service guarantees at prices which are appropriate for his or her network.

Descriptions of illustrative embodiments of the CNS 105 may be found in commonly-owned, co-pending U.S. patent application Ser. No. 12/332,214, entitled, "PROVIDING ACCESS TO CONFIGURABLE PRIVATE COMPUTER NETWORKS," the entirety of which is incorporated herein by reference. The CNS 105 may include a manager module 110 for use in creating and configuring private network extensions 120 for use in conjunction with existing private computer networks 130. In further embodiments, at least some of the created private network extensions 120 may be configured to enable secure, private access from one or more corresponding private computer networks 130 over the network 108 (e.g., via Virtual Private Network (VPN) connections).

In an embodiment, the manager module 110 of the CNS 105 may receive the information regarding the supporting computing resources. The manager module 110 may create and configure the private network extensions 120 as discussed below in the specified quantity.

The CNS manager module 110 may further execute on one or more computing systems of the CNS 105 and may provide one or more APIs that enable a user of a computing device included in the private computer network 130 to programmatically interact with the module 110 to access some or all of the functionality of the CNS 105 on behalf of the user (e.g., to create, configure, and or initiate use of the private network extensions 120). Additionally, in some embodiments, users may instead manually interact with the manager module 110 (e.g., via a user interface provided by the manager module 110 or the user interface component 104 to perform some or all of such actions). For example, interactions between the user and the CNS manager module 110 in order to create and configure the private network extensions 120 for the user may be initiated when the telephony resource allocation service 102 submits the information regarding the allocated telephony resources and the configuration information to the CNS 105.

Those skilled in the art will appreciate that the network 108 may be any wired network, wireless network, or combination thereof. In addition, the network 108 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

The private network extensions 120, may each include multiple computing nodes, at least some of which are provided by or otherwise under the control of the CNS 105. Each of the provided network extensions may be further configured in various ways by the private computer network 130 for whom they are provided. Each of the private network extensions 120 may be a private computer network that is accessible only by the private computer network 130 for which it is created. In other embodiments, though, at least some of the private network extensions 120 provided by the CNS 105 for the private computer network 130 may be publically accessible and/or may be stand alone computer networks that are not extensions to other computer networks. Similarly, while the private network extensions 120 may communicate with computer networks 130 that are private, in other embodiments, the private network extensions 120 may communicate with computer networks 130 that are not private.

Private access between a private computer network 130 and corresponding private network extensions 120 may be enabled in various ways. One such way is by establishing a VPN connection or other secure connection between the private network extensions 120 and computer networks 130 that allow for intercommunication over the network 108 in a secure, private matter. For example, the CNS 105 may automatically perform appropriate configuration on its computing nodes and other computing systems to enable VPN access to a particular private network extension 120, such as by automatically configuring one or more VPN mechanisms hosted by the CNS 105 (e.g., software and/or hardware VPN mechanisms), and/or may automatically provide appropriate configuration information to the private computer network 130 (e.g., credentials, access points, and/or other parameters) to allow a VPN mechanism hosted on the private computer network 130 to establish VPN access.

After VPN access has been appropriately enabled and/or configured, a VPN connection may be established between the private computer network 130 and the private network extensions 120, such as initiated by the user using Internet Protocol Security (IPsec) or other appropriate communication technologies. For example, in some embodiments, a VPN connection or other secure connection may be established to or between networks that use Multi Protocol Label Switching (MPLS) for data transmission, instead of an IPsec-based VPN connection.

In additional embodiments, the user of a computing device included in the private computer network 130 may also interact with the module 100 to exchange additional configuration parameters for use in facilitating communication between the private network extensions 120 and the private computer network 130. Examples of such configuration parameters include, but are not limited to, network addresses for the private network extensions 120 provided to the private computer network 130, network topology information for the private network extensions 120 provided to the private computer network 130 and network access constraint information for the private network extensions 120 supporting to the private computer network 130. Further information regarding the exchange of information such as network addresses, network topology, and network access constraints may be found in U.S. patent application Ser. No. 12/332,214, entitled, "PROVIDING ACCESS TO CONFIGURABLE PRIVATE COMPUTER NETWORKS" and previously incorporated herein by reference.

In certain embodiments, the private network extensions 120 provided by the CNS 105 may further execute one or more instances of an automated call distribution service (ACD) that automatically distributes calls. As discussed in greater detail below, telephony resources, such as telephone lines and telephone numbers, may be allocated to a the private network extensions 120 in response to a request. These allocated telephony resources may be further associated, by the CNS 105, with the ACD instances executed by the private network extensions 120 provided for the private computer network 130. As a result, calls carried by the allocated telephony resources may be distributed by ACD instances, executed on the private network extensions 120, to the private computer network 130. The private computer network 130, which may form a call center including customer service agents (CSAs), may respond to received calls.

A determination may also be made as to the number of ACD instances are to be executed by the private network extensions 120. The number of ACD instances which are executed may be based, at least in part, upon the telephony resources (e.g., number of telephone lines and/or telephone numbers) allocated to the private computer network 130. For example, the number of ACD instances which are executed may be selected such that the executed ACD instances may distribute a number of telephone calls greater than or equal to the maximum number of telephone calls that may be received for distribution by the allocated telephony resources.

For example, assume that an ACD instance may distribute a selected number of calls over a given time period (e.g., ten). Further assume that the telephony resources to be allocated to the private computer network may receive a maximum number of calls which may need distribution over the given time period (e.g., 100). Then, in this example, it may be determined that at least 10 ACD instances may be needed to distribute the maximum number of calls which may be received for distribution by the allocated telephony resources (10 calls distributed/ACD×10 ACDs=100 calls distributed) This determined number of ACD instances may be distributed to the configurable network service 105 during creation of the private network extensions 120. In certain embodiments, the determination may be made by the telephony resource management component 106.

In certain embodiments, the private computer network 130 may further communicate with the private network extensions 120 so as to provide instructions to the ACD instances as how to distribute calls received by the private network extensions 120 to the CSAs of the private computer network 130.

Descriptions of illustrative embodiments of a call distribution service may be found in U.S. patent application Ser. No. 12/192,067, entitled, "SYSTEM AND METHOD FOR AUTOMATED CALL DISTRIBUTION," the entirety of which is hereby incorporated by reference. In brief, such a call distribution service may be represented in hardware, software, and combinations thereof and may be operative to allocate, route, and maintain connections between an end user which places a call and a CSA of the call center implemented by the private computer network 130. Connections may be established between the end user's telephone, the CSA's telephone, and client devices operated by the CSA. The ACD instances may further connect end users and CSAs through networks such as network 108, which may include networks operated by telephony carriers and other data carriers.

It may be understood that embodiments of the disclosed systems and methods may be employed both for private computer networks 130 for which private network extensions 120 are not presently provided (e.g., private computer network 130 for which private network extensions 120 have not previously been provided or private computer networks 130 for which no private network extensions 120 are currently provided), as well as private computer networks 130 for which private network extensions 120 are presently provided. For example, private computer networks 130 for which private network extensions 120 executing one or more instances of ACD instances may submit a request for additional telephony resources if their call demand increases. Accordingly, additional private network extensions 120 may be created by the CNS 105.

Instead of creating a new private network extensions 120 executing one or more instances of ACD services, the telephony allocation resource system 102 may determine whether the currently executing ACD instances are sufficient to support the requested additional telephony resources. That is to say, are the currently executing ACD services capable of distributing all calls transmitted over the originally requested telephony resources and the additionally requested telephony resources.

This determination may be made similarly to the original determination of the number of ACD services to be executed. The maximum number of calls which may be received for distribution with the addition of the telephony resources requested for allocation is approximately equal to the ratio of the sum of the maximum number of calls which may be received for distribution by the currently allocated telephony resources and the maximum number of calls which may be received for distribution by the telephony resources requested for allocation. As before, a single ACD instance may distribute a fixed number of calls at a given time. Thus, the number of ACD instances needed to support the requested additional telephony resources may be given by the ratio of the sum of the maximum number of calls which may be received for distribution by the currently allocated telephony resources and the maximum number of calls which may be received for distribution by the telephony resources requested for allocation and the fixed number of calls a single ACD may distribute at a given time.

If the value of this ratio exceeds the number of currently executed ACD instances, then additional ACD instances may be needed to support the additional telephony resources requested. If, however, the value of this ratio does not exceed the number of currently executed ACD instances, then additional ACD instances may not be needed to support the additional telephony resources requested. Put another way, if the maximum number of calls the currently allocated telephony resources and telephony resources to be allocated may receive for distribution remains unchanged from the maximum number of calls the currently allocated telephony resources, the ACD resources currently executed may be sufficient to support the additional requested telephony resources.

Figure 2A:
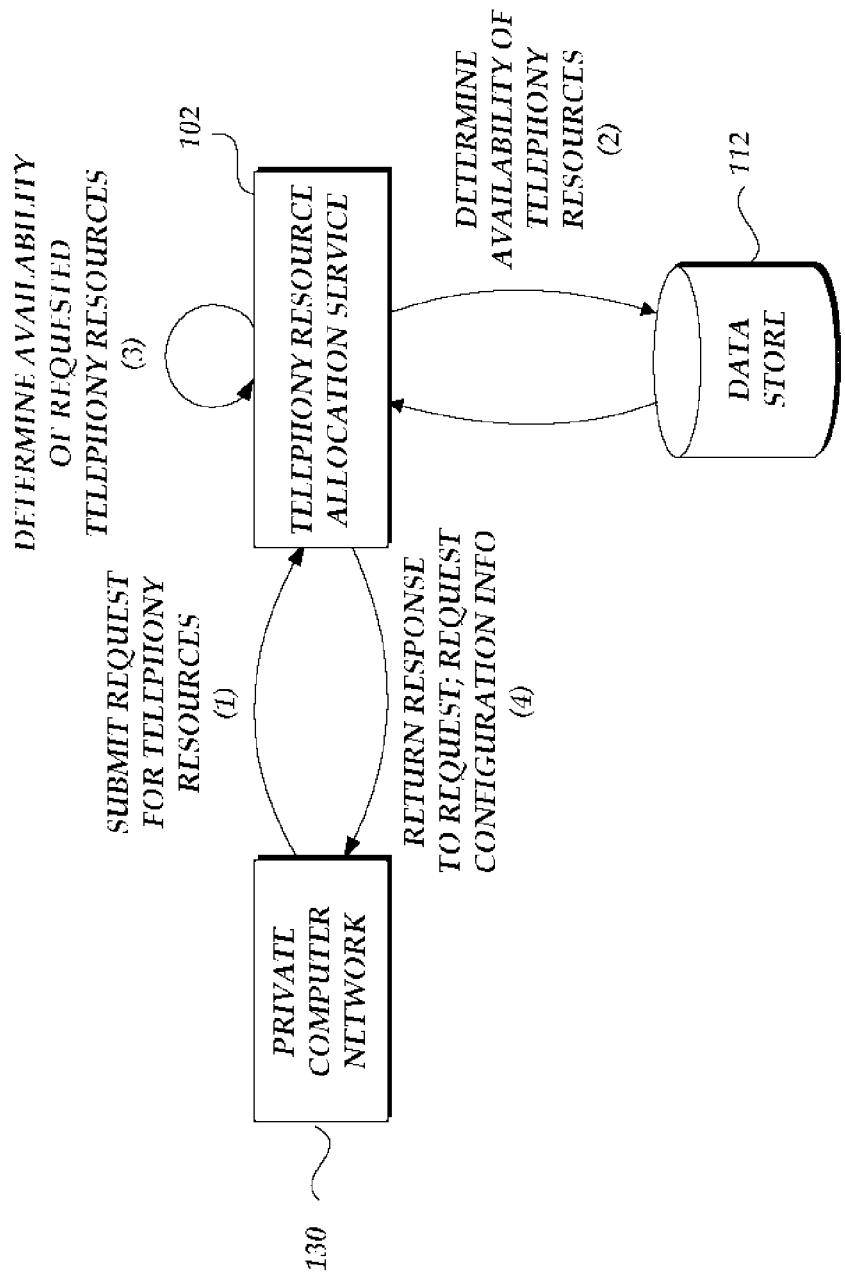
FIG. 2A is a block diagram of the operating environment of FIG. 1, illustrating the telephony resource allocation service responding to a telephony resource allocation request from a user of the private computer network.

FIG. 2A is a block diagram of the operating environment of FIG. 1, illustrating a user of a computing device in a private computer network 130 submitting a request to the telephony resource allocation service 102 for telephony resources. A user may communicate with telephony resource allocation service 102 via user interfaces displayed by user computing devices within the private computer network 130. Such a computing device may include, but is not limited to, a laptop or tablet computer, personal computer, personal digital assistant (PDA), hybrid PDA/mobile telephone, mobile telephone, electronic book reader, set-top box, camera, digital media player, and the like.

For example, the request may include a request for telephony resources. The request may be transmitted to the telephony resource allocation service 102, and the telephony resource allocation service 102 may further detect that a determination regarding available telephony resources is needed to respond. Optionally, the telephony resource allocation service 102 may further detect that a determination regarding supporting computing resources is also needed to response. In certain embodiments, the telephony resource allocation service 102 may determine available telephony resources and, as necessary, available computing resources and an estimate of supporting computing resources in order to satisfy the requested telephony resource request.

The telephony resource allocation service 102 may further compare the available telephony resources to the requested telephony resources. Optionally, the telephony resource allocation service 102 may also compare the quantity of available computer networks and/or associated computing nodes to the estimate of a needed quantity of computer networks and/or associated computing nodes to satisfy the requested telephony resource request. Based upon the results of the comparison, the telephony resource allocation service 102 may return a response to the private computer network 130 indicating that the telephony resource allocation service 102 may satisfy the telephony resource request in full, in part, or not at all, along with an offer of telephony resources which may be.

In the response to the request for telephony resources, the telephony resource allocation service 102 may further include a request for additional configuration information. The returned request may indicate that, should the private computer network 130 wish to receive the telephony resource allocation offered by the telephony resource allocation service 102, configuration information enabling the CNS 105 to communicate with the private computer network 130 should be submitted.

Figure 2B:
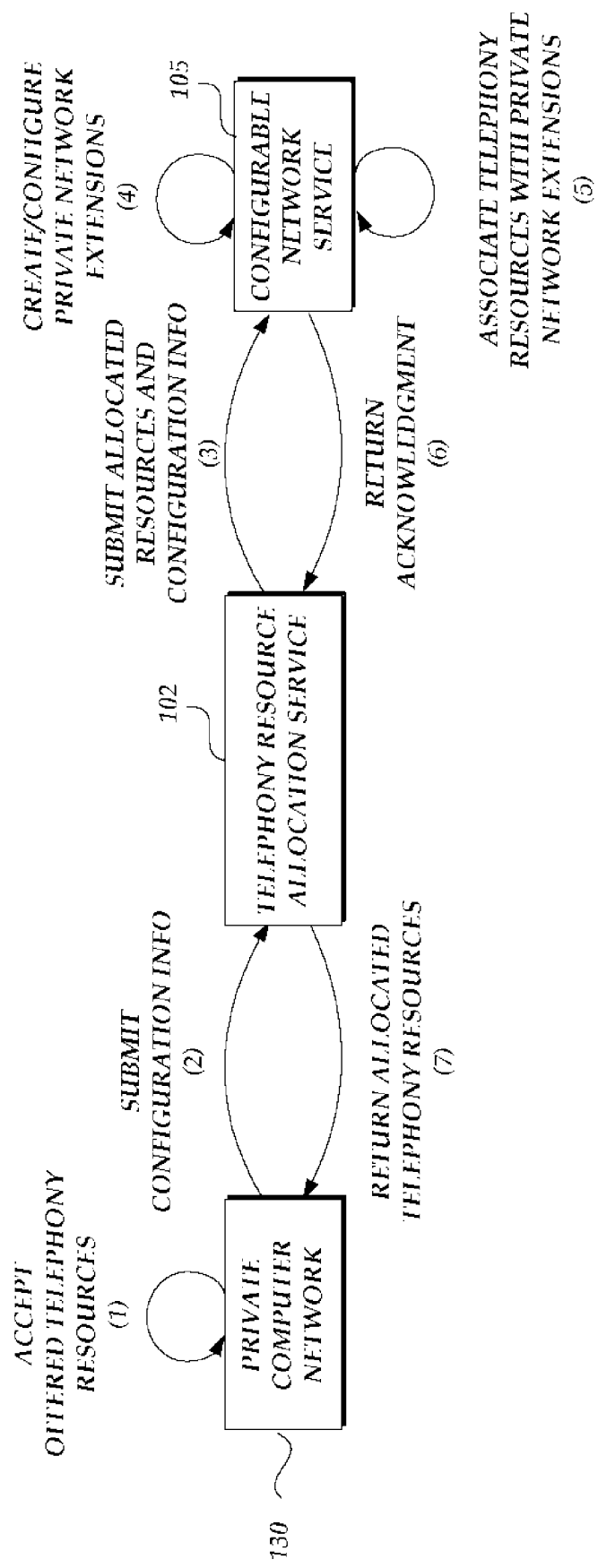
FIG. 2B is a block diagram of the operating environment of FIG. 1, illustrating the telephony resource allocation service in communication with a configurable network service (CNS) to provide telephony resources and private network extensions in response to the telephone resource allocation request from the user of the private computer network.

FIG. 2B is a block diagram of the operating environment of FIG. 1, illustrating the submission of configuration information to the telephony resource allocation service 102 from the private computer network 130 in order to receive a specified allocation of telephony resources.

The telephony resource allocation service 102, in turn, may submit the resources to be allocated, the configuration information, and the previously determined information regarding the allocated telephony resources (e.g., the supporting computing resources in order to satisfy the requested telephony resource request) to the CNS 105. The telephony resource allocation service 102 may further submit the number of ACD instances needed to support the requested telephony resources. The CNS may then create the supporting computing resources (e.g., private network extensions 120 and/or associated computing nodes, as well as ACD instances) needed in order to satisfy the requested telephony resource request. The CNS 105 may further employ the configuration information received from the telephony resource allocation service 102 to communicate directly with the user in order to configure the created private network extensions 120 for operation with the private computer network 130.

As discussed above, the private network extensions 120 may further execute one or more instances of an automated call distribution service. The CNS 105 may also associate the allocated telephony resources (e.g., telephone lines and/or telephone numbers) with the private network extensions 120 created for the private computer network 130.

Once the private network extensions 120 are created and configured, as well as associated with the telephony resources allocated to the private computer network 130, the CNS 105 may return an acknowledgement to the telephony resource allocation service 102. In turn, the telephony resource allocation service 102 may provide the private computer network 130 with the allocated telephony resources for immediate use by the private computer network 130. For example, the telephony resource allocation service 102 may provide the private computer network 130 with telephone lines and/or telephone numbers for use in conjunction with call centers maintained by the private computer network 130.

In the event that private network extensions 120 are currently provided for the private computer network 130, it may be unnecessary to provide new private network extensions 120 for allocating new telephony resources to the private computer network 130. Instead, it may be sufficient to determine whether additional ACD instances should be executed on the private network extensions 120.

Figure 2C:
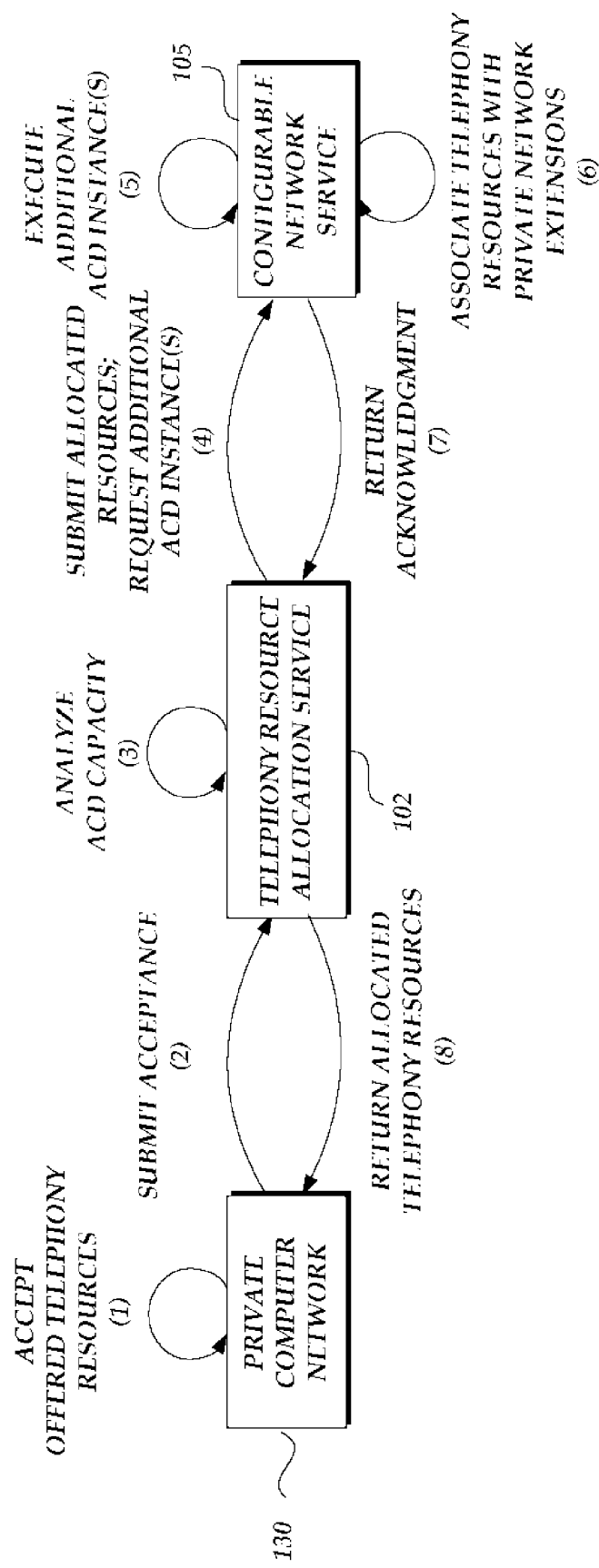
FIG. 2C is a block diagram of the operating environment of FIG. 1, illustrating the telephony resource allocation service in communication with the CNS to request execution of additional automated call distribution (ACD) instances the network extensions.

As illustrated in the block diagram of FIG. 2C, the private computer network 130 may accept the allocation of telephony resources offered by the telephony resource allocation service 102. In response to this acceptance, the telephony resource allocation service 102 may determine whether ACD instances currently executing on the private network extensions 120 are sufficient to support the additional telephony resources requested. For example, as discussed above, the telephony resource allocation service 102 may compare the maximum number of calls which may be distributed by currently executing ACD instances to the estimated maximum number of calls which may be received for distribution should the requested telephony resources be allocated to the private computer network 130.

If the estimated maximum number of calls which may be distributed by the ACD instances exceeds the present maximum number of calls which may be received for distribution by the ACD instances with the allocation of new telephony resources, the telephony resource allocation service 102 may determine that additional ACD instances are needed. The telephony resource allocation service 102 may then submit a request to the CNS 105 to execute additional ACD instances.

This request may be submitted along with the telephony resources to be allocated to the private computer network 130. The additional telephony resources to be allocated to the private computer network 130 may be further associated with the previously private network extensions 120, including the newly executed ACD instances. An acknowledgement of the same may also be transmitted to the telephony resource allocation service 102.

If the estimated maximum number of calls which may be distributed by the ACD instances does not exceed the present maximum number of calls which may be received for distribution by the ACD instances with the allocation of new telephony resources, the telephony resource allocation service 102 may determine that additional ACD instances are not needed. The telephony resource allocation service 102 may then submit only the telephony resources that are to be allocated to the private computer network 130 to the CNS 105. The additional telephony resources to be allocated to the private computer network 130 may also be associated with the previously private network extensions 120. An acknowledgement of the same may also be transmitted to the telephony resource allocation service 102.

Following acknowledgement that the allocated telephony resources are associated with the private network extensions 120, and optionally that additional ACD instances are executed, the telephony resource allocation service 102 may return the allocated telephony resources to the private computer network 130.

Figure 3:
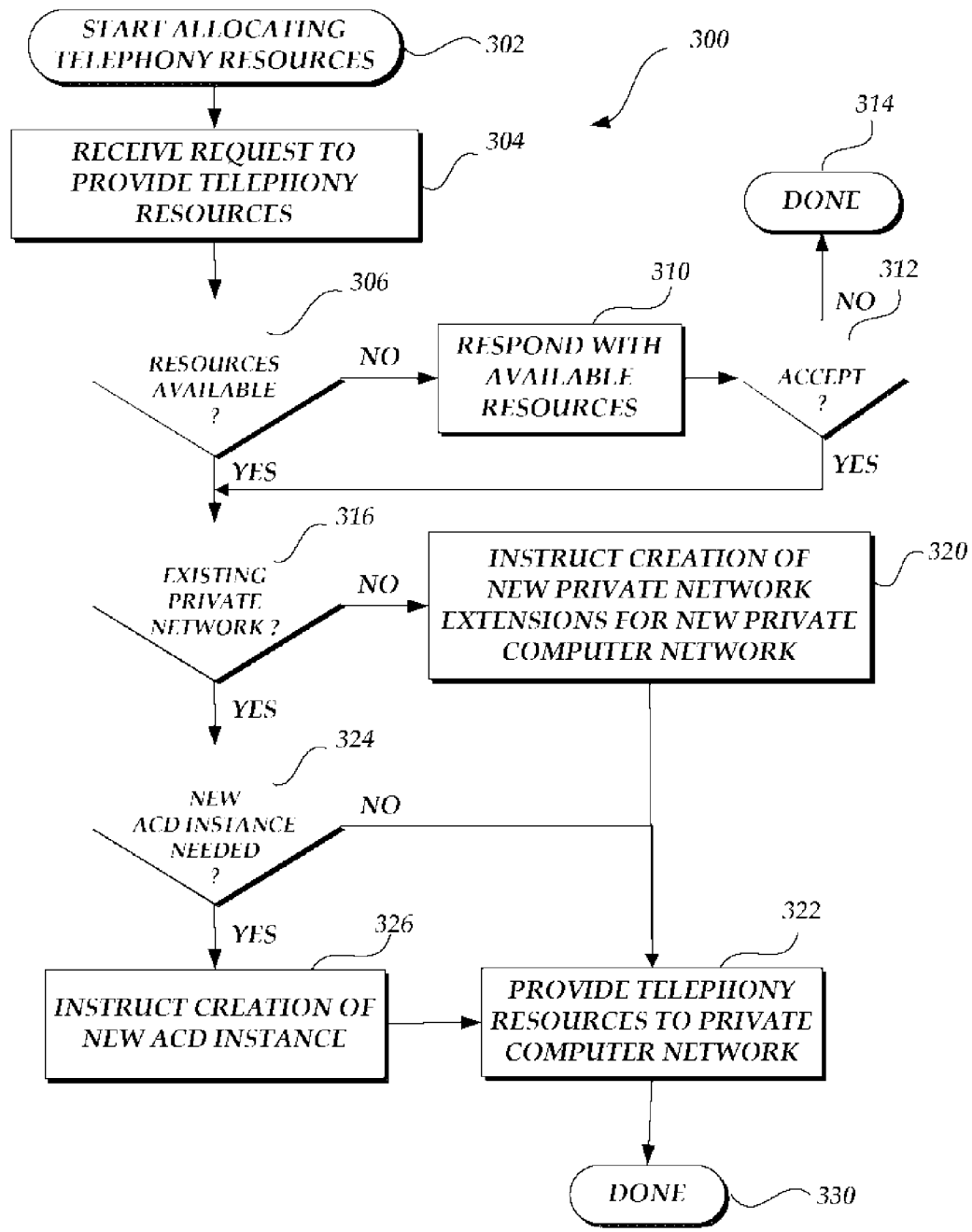
FIG. 3 is a flow diagram of an illustrative routine implemented by the telephony resource allocation service to provide telephony resources requested by the user of the private computer network.

FIG. 3 is a flow diagram of an illustrative routine 300 implemented by the telephony resource allocation service 102 to allocate telephony resources to the private computer network 130. The routine 300 begins in block 302 and proceeds to block 304, where the telephony resource allocation service 102 receives a request for telephony resources. As described above, the request may include an amount of telephony resources desired by the private computer network 130, such as telephone lines and/or telephone numbers for a selected duration of time.

In block 306, the telephony resource allocation service 102 may determine whether telephony resources sufficient to satisfy the user request are available. For example, the telephony resource allocation service 102 may review the telephony resources requested and compare this to the available telephony resources. If the available telephony resources are greater than the requested amount, the routine 300 may move to block 316, where a determination is made regarding whether the private computer network 130 is an existing private computer network 130. If the available telephony resources are less than the requested telephony resources, the routine may move to block 310, where the telephony resource allocation service 102 may respond to the private computer network 130 with the available telephony resources.

In block 312, the telephony resource allocation service 102 may determine if the private computer network 130 accepts the offered allocation of telephony resources. If the private computer network 130 does not accept the offered allocation of telephony resources, the routine 300 may end at block 314. If, however, the private computer network 130 accepts the offered allocation of telephony resources, the routine 300 may move to block 316

The telephony resource allocation service 102 may make a determination in block 316 whether the private computer network 130 is an existing private computer network 130. Such a determination may be made, for example, determining if private network extensions 120 are or are not presently provided to the private computer network 130. If private network extensions 120 are not presently provided to the private computer network 130, then the private computer network 130 may be determined to be a new private computer network 130. If private network extensions 120 are presently provided to the private computer network 130, then the private computer network 130 may be determined to be an existing private computer network 130.

In the event that the private computer network 130 is a new private computer network 130, the telephony resource allocation service 102 may instruct that one or more private network extensions 120 be created for the new private computer network 130 in block 320. In certain embodiments, an instruction for the creation of a new private network extension 120 may include submitting information regarding the allocated resources to be provided to the private computer network 130 and configuration information for communicating with the private computer network 130 to the CNS 105. Upon creation of the new private network extensions 120 the telephony resources allocated to the private computer network 130 may be provided to the private computer network 130 in block 322.

In the event that the private computer network 130 is determined to be an existing private computer network 130 in block 316, a further determination may be made in block 324 as to whether a new ACD instance may be needed to support the telephony resources which are to be allocated to the private computer network 130. As discussed above, the telephony allocation resource system 102 may compare the maximum number of calls which may be distributed by currently executing ACD instances to an estimate of the maximum number of calls which may be received for distribution by the ACD instances with the allocation of the new telephony resources should the requested telephony resources be allocated to the private computer network 130.

If the estimated maximum number of calls which may be distributed by the presently executed ACD instances does not exceed the present maximum number of calls which may be received for distribution by ACD instances with the allocation of new telephony resources, the telephony resource allocation service 102 may provide the telephony resources to the private computer network 130 in block 322. If, however, the estimated maximum number of calls which may be distributed by the ACD instances exceeds the maximum number of calls which may be received for distribution by the ACD with the allocation of new telephony resources, the telephony resource allocation service 102 may request that one or more new ACD instances be executed to handle distribution of the additional calls. Upon execution of the new ACD instances, the newly allocated telephony resources may be associated with new and presently executed ACD instances and the telephony resources allocated to the private computer network 130 may be provided to the user in block 322. The routine 300 may then conclude in block 330.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method to increase telephony resources of a user computer network, the computer-implemented method comprising:
    as implemented by one or more computing devices including computer-executable instructions:
        maintaining telephony resources available to increase existing telephony resources of the user computer network;
        allocating at least a portion of the telephony resources to the user computer network, wherein the allocated portion is distinct from existing telephony resources of the user computer network;
        generating a telephony-capable communication link to the user computer network, wherein the telephony-capable communication link enables the user computer network to receive at least one telephone call via the allocated portion of telephony resources without utilization of the existing telephony resources of the user computer network;
        receiving, via the allocated portion of telephony resources, the at least one telephone call for delivery to the user computer network; and
        distributing the at least one telephone call to the user computer network via the generated telephony-capable communication link.

2. The method of claim 1, wherein the allocated portion of telephony resources comprises at least one of telephone lines or telephone numbers.

3. The method of claim 1, wherein the portion of the telephony resources are allocated to the user computer network in response to a demand level of the existing telephony resources of the user computing network.

4. The method of claim 1 further comprising de-allocating the portion of the telephony resources in response to a reduction in the demand level of the existing telephony resources of the user computing network.

5. The method of claim 1, wherein the portion of the telephony resources is allocated to the user computer network in response to a request to increase the existing telephony resources of the user computer network.

6. The method of claim 5, wherein the request to increase the existing telephony resources of the user computer network is received from the user computer network.

7. The method of claim 1 further comprising:
    allocating an additional portion of the telephony resources to the user computer network;
    receiving, via the additional portion of telephony resources, an additional telephone call for delivery to the user computer network; and
    distributing the additional telephone call to the user computer network via the generated telephony-capable communication link.

8. A system to allocate telephony resources to a user computer network, the system comprising:
    one or more physical processors associated with a set of telephony resources that are available to increase existing telephony resources of the user computer network, wherein the one or more physical processors are configured with specific computer-executable instructions that, when executed, cause the one or more physical processors to:
        allocate at least a portion of the set of telephony resources to the user computer network, wherein the allocated portion is distinct from the existing telephony resources of the user computer network;
        generate a telephony-capable communication link to the user computer network that enables the user computer network to receive at least one telephone call via the allocated portion of telephony resources without utilization of the existing telephony resources of the user computer network;
        receive, via the allocated portion of telephony resources, the at least one telephone call for delivery to the user computer network; and
        transmit the at least one telephone call to the user computer network via the generated telephony-capable communication link.

9. The system of claim 8, wherein the computer-executable instructions further cause the one or more physical processors to generate a network extension service, and wherein reception and transmission of the at least one telephone call are performed by the generated network extension service.

10. The system of claim 9, wherein the network extension service implements at least one instance of a call distribution service.

11. The system of claim 10, wherein a number of instances of the call distribution service implemented by the network extension service is dependent upon a number of telephony resources within the ==set of allocated portion of telephony resources.

12. The system of claim 9, wherein the computer-executable instructions further cause the one or more physical processors to select a computing device on which to generate the network extension service.

13. The system of claim 12, wherein the computing device on which to generate the network extension service is selected based at least in part on a network distance between the computing device and the user computer network.

14. The system of claim 8, wherein the allocated portion of telephony resources is allocated to the user computer network in response to a demand level of the existing telephony resources of the user computing network.

15. The system of claim 8, wherein the computer-executable instructions further cause the one or more physical processors to de-allocate the allocated portion of telephony resources in response to a reduction in a demand level of the existing telephony resources of the user computing network.

16. A non-transitory, computer-readable medium including computer-executable instructions that, when executed by one or more processors, cause the one or more processors to:
- allocate to a user computer network a set of telephony resources available to increase existing telephony resources of the user computer network, wherein the allocated set of telephony resources is distinct from the existing telephony resources of the user computer network;
- generate a telephony-capable communication link to the user computer network that enables the user computer network to receive at least one telephone call via the allocated set of telephony resources without utilization of the existing telephony resources of the user computer network;
- receive, via the allocated set of telephony resources, the at least one telephone call for delivery to the user computer network; and
- transmit the at least one telephone call to the user computer network via the generated telephony-capable communication link.

17. The non-transitory, computer-readable medium of claim 16, wherein the computer-executable instructions further cause the one or more processors to distribute the at least one telephone call to a customer service agent associated with the user computer network.

18. The non-transitory, computer-readable medium of claim 16, wherein the set of telephony resources are allocated to the user computer network in response to a demand level of the existing telephony resources of the user computing network.

19. The non-transitory, computer-readable medium of claim 16, wherein the computer-executable instructions further cause the one or more processors to de-allocate the set of telephony resources in response to a reduction in a demand level of the existing telephony resources of the user computing network.

20. The non-transitory, computer-readable medium of claim 16, wherein the set of telephony resources is allocated to the user computer network in response to a request to increase the existing telephony resources of the user computer network.

* * * * *

UNITED STATES PATENT AND TRADEMARK OFFICE
CERTIFICATE OF CORRECTION

| | | |
|---|---|---|
| PATENT NO. | : 9,083,803 B2 | Page 1 of 1 |
| APPLICATION NO. | : 14/536453 | |
| DATED | : July 14, 2015 | |
| INVENTOR(S) | : Chou et al. | |

It is certified that error appears in the above-identified patent and that said Letters Patent is hereby corrected as shown below:

Title Page

Page 1 (item 57, Abstract) at line 4, Change "may" to --may be--.

In the Specification

In column 5 at line 60, Change "102" to --102.--.

In column 8 at line 16, Change "and or" to --and/or--.

In column 9 at line 39, Change "a the" to --the--.

In column 13 at line 60, Change "316" to --316.--.

In the Claims

In column 16 at line 49, In Claim 11, after "the" delete "==set of".

Signed and Sealed this
Eighth Day of March, 2016

Michelle K. Lee
*Director of the United States Patent and Trademark Office*